Oct. 14, 1969
R. W. HILTON
3,472,416
PRESSURE COMPENSATING RESEALABLE PLUG
Filed May 29, 1968
2 Sheets-Sheet 1
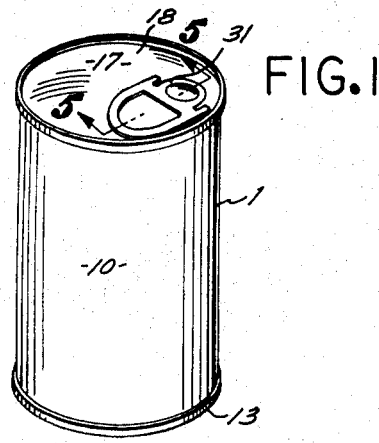
FIG.1
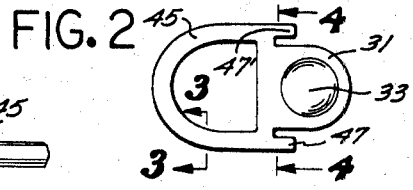
FIG.2
FIG.3
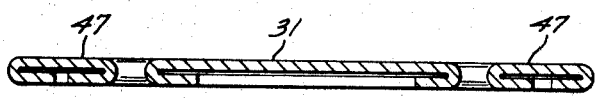
FIG.4
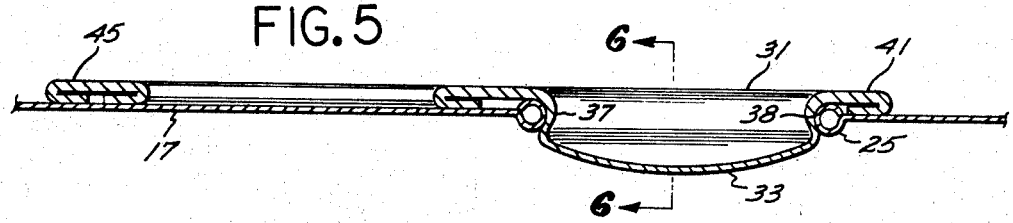
FIG.5
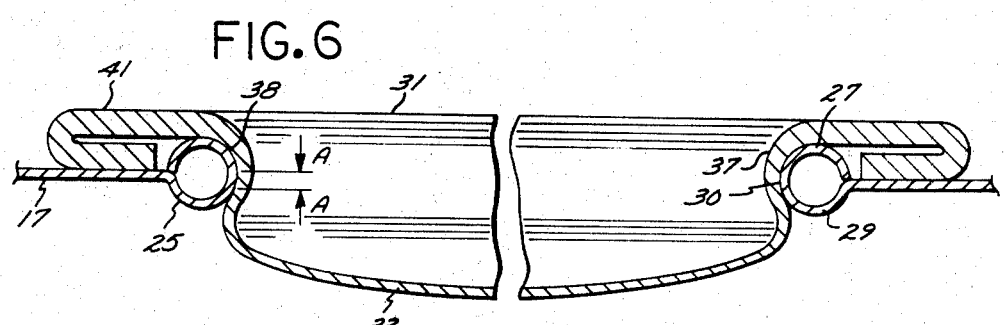
FIG.6
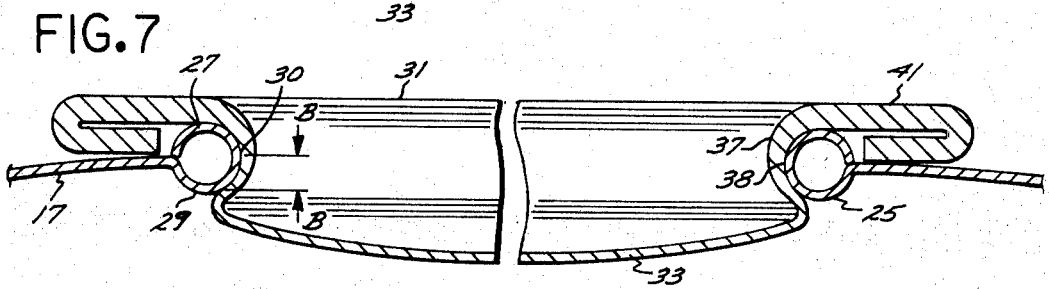
FIG.7
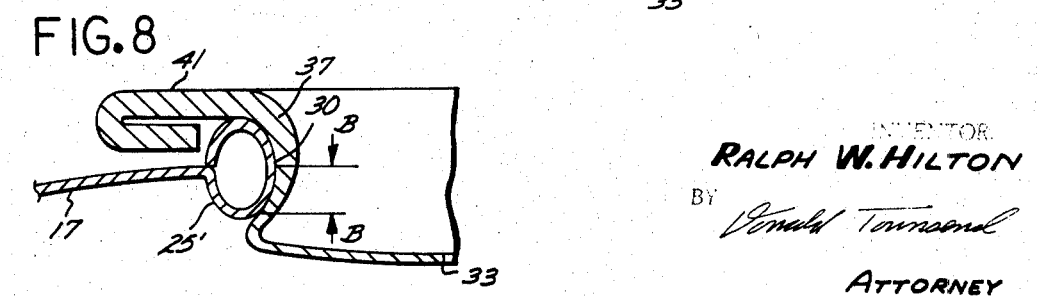
FIG.8
INVENTOR.
RALPH W. HILTON
BY
Donald Townsend
ATTORNEY United States Patent Office 3,472,416
Patented Oct. 14, 1969

3,472,416
PRESSURE COMPENSATING RESEALABLE PLUG
Ralph William Hilton, Torrance, Calif., assignor to Harvey Aluminum (Incorporated), Torrance, Calif., a corporation of California
Filed May 29, 1968, Ser. No. 733,037
Int. Cl. B65l 17/20, 51/22
U.S. Cl. 220—60                                                10 Claims

ABSTRACT OF THE DISCLOSURE

A pressure compensating plug is provided which can be removably mounted in the flanged opening of a can wall, the plug which is constructed of a deformable resilient material comprises side walls having a peripheral recess therein shaped to receive at least a portion of the flange and a closure wall which completely traverses the opening and has at least its peripheral edges spaced inwardly from the plane of the opening when the plug is mounted in the opening, the closure wall being inwardly convex to facilitate peripheral expansion upon application of pressure thereto from within the container.

---

In many of the metal containers used for carbonated soft drinks, beer, and the like, internally developed gaseous pressure as well as impact pressure due to rough handling often causes bulging or flexing of the container ends. When a conventional snap-in type friction plug is used in sealing the opening in the lid of a container as, for example, in U.S. Patent 3,080,088, the internally developed pressure not only tends to deform the lid, but can also cause displacement of the plug and rupture of the hermetric seal. Efforts to reduce such displacement and leakage around these resealable snap-in plugs, especially in the case of plugs constructed of plastic, have not been entirely successful because even the slight elastic deformation of the plug itself is often enough to cause rupture of the seal.

To minimize leakage around a snap-in type plug sealing a pressurized container, it has been proposed to employ a deformable resilient plug having an inwardly convex bottom wall closing off and lying in the plane of the opening (see U.S. Patent 3,133,666). When this type of plug is used in sealing a pressurized can, the internal pressure acts to flatten the plug bottom wall and effect peripheral enlargement thereof with the sealing pressure between the plug and can opening thereby being increased. A sudden impact upon a pressurized container using such a plug can, however, cause rupture of the seal and unseating of the plug; consequently, such cans are unsatisfactory where a high degree of reliability is needed. When a locking flange is provided on the plug to minimize ruptures and tightly secure it to the container, even under rough handling conditions, the plug is necessarily so tightly locked in the opening that a separate device must be used to pry it out of the opening.

It is therefore a principal object of the invention to provide an improved container having in an opening therein a tightly locked and hermetically resealable closure plug.

Another object is to provide for use with a pressurized can an improved closure plug which remains securely locked in the opening even under conditions of rough handling.

Still another object is to provide in the opening of a can an improved closure plug whose sealing contact with the can is improved with an increase in internal pressure.

Yet another object of the invention is to provide an improved pressure compensating plug and associated therewith a pull ring to facilitate easy removal of the plug from the can opening.

These and other objects and advantages of the invention will become apparent upon reference to the following detailed description, drawings, and claims appended hereto.

According to the present invention, a pressure compensating plug constructed of a deformable resilient material is provided with an inwardly convex closure wall which in its seated position in a wall opening of a can lies below the plane of the opening, thereby facilitating peripheral expansion of the closure wall upon application of pressure thereto from within the can. As the internal pressure within the can increases, the closure wall flattens and moves the plug side wall outwardly into sealing contact with additional surface of a flange which defines the opening in the lid.

Preferably, an annular curl with a smoothly curved surface is formed about the opening in the lid and the plug side walls are provided with a peripheral recess shaped to receive at least a portion of the flange. When such a plug is seated in the opening of an unpressurized can, only a relatively small area of the flange lying below the surface of the lid is in sealing contact with the flange. As pressure within the can is increased and the closure wall expands peripherally, the side walls of the plug expand outwardly until the surface of the recess therein comes into sealing contact with and assumes the shape of the flange.

To minimize displacement of the plug in the opening upon pressurization of the can, the flange is preferably formed with a portion thereof extending below the plane of the opening and within the container, the surface of this lower portion of the flange being spaced outwardly from the surface of the flange which lies in the plane of the opening. When the plug of the present invention is mounted in such a flanged opening and the can is pressurized, a lower portion of the recess in the side wall of the plug moves into sealing contact with the lower portion of the flange. At the same time, the plug closure wall which is now expanded to a diameter greater than that of the opening has its peripheral edges securely locked under and about the flange, thereby preventing outwardly displacement of the plug.

In most instances, normal carbonation pressures within the container will effect peripheral expansion of the convex closure wall until at least about 75% of the side wall area of the plug lies in sealing contact with the flanged opening. Preferably, a plug is employed which when expanded peripherally under normal carbonation pressures has at least about 5% of its side wall area out of sealing contact with the flange. The peripheral edges of the closure wall of such a fully expanded plug extend outwardly under the lower portion of the flange a distance sufficiently to inhibit outward displacement of the plug under conditions of rough handling. An externally applied moderate outward force on such a mounted plug will, however, effect sufficient peripheral contraction to facilitate easy removal of the plug from the opening.

The invention will be more clearly understood by reference to the several views illustrated in the accompanying drawings in which:

FIG. 1 is a perspective view of a container sealed with the closure plug of the present invention;

FIG. 2 is a plan view of the plug closure of the present invention;

FIG. 3 is a vertical section on an enlarged scale taken substantially along line 3—3 of FIG. 2;

FIG. 4 is an enlarged vertical section taken along line 4—4 of FIG. 2, illustrating the lever arms which facilitate removal of the plug closure from a can;

FIG. 5 is a vertical section taken along line 5—5 of FIG. 1;

FIG. 6 is an enlarged vertical section taken along line

Figure 9:
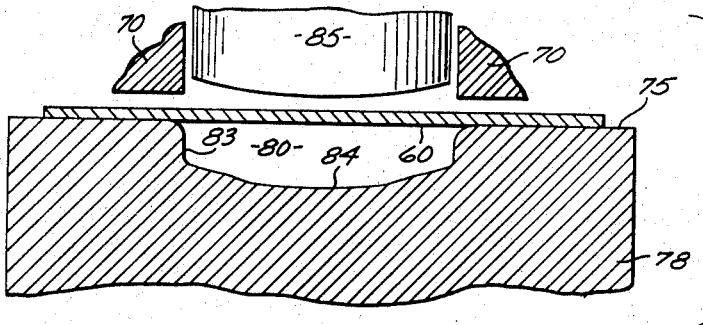
Figure 10:
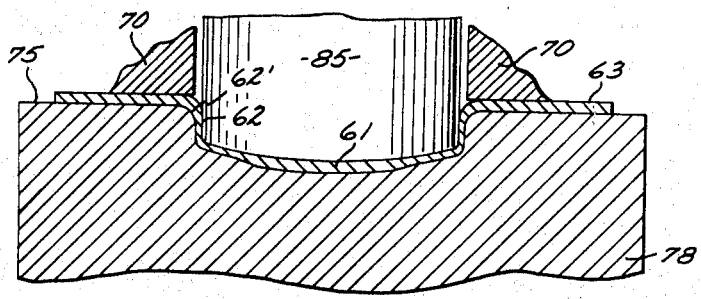
Figure 11:
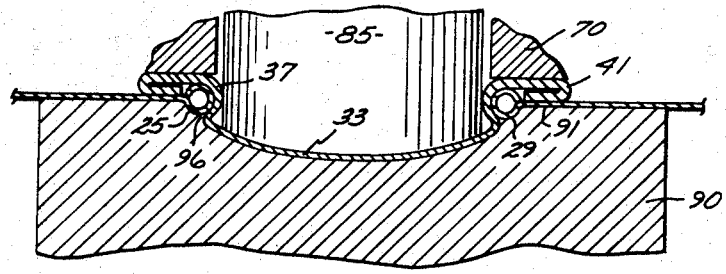
Figure 12:
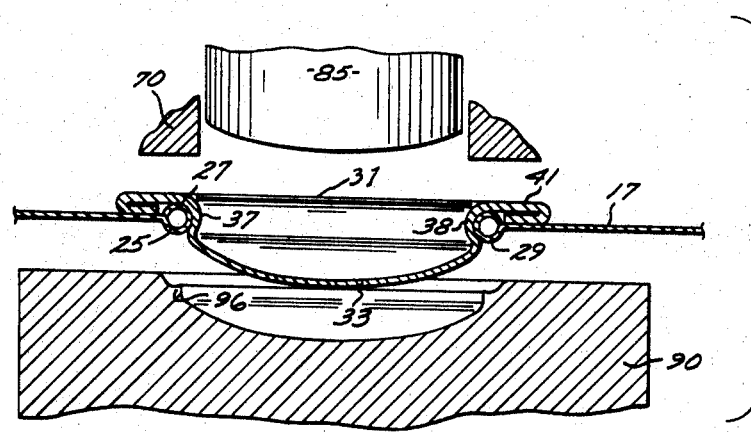

6—6 of FIG. 5, showing the plug sealing area between lines A—A below the surface of the container lid when there is little or no internal pressure in the container;

FIG. 7 is a sectional view of the container lid and plug of FIG. 6 when internal pressure within the container causes deformation thereof, the distance between lines B—B illustrating the increase in sealing area of the plug below the lid surface;

FIG. 8 is an enlarged fragmentary sectional view of a modified container lid with a plug of the present invention inserted in the opening therein;

FIG. 9 is a side elevation of a blank resting on a cupping die with the punch used in coining the blank positioned thereabove;

FIG. 10 is a sectional view of the blank of FIG. 9 after the cupping operation;

FIG. 11 is a sectional view of a can lid with the blank of FIG. 10 being radially extruded while seated in the lid opening;

FIG. 12 is a sectional view showing a can lid with a plug closure securely locked in an opening therein after the radial extrusion operation shown in FIG. 11.

Referring now to the drawings in detail, there is illustrated in FIG. 1 a container indicated generally at 1 which comprises a tubular body having a bottom end member 13 secured to its lower end and an upper end or lid 17 secured to and closing off its upper end. These end members which are preferably formed of thin gauge sheet metal can be secured or clinched to tubular body 10 in a conventional manner by means of a double seam or the like.

Formed in upper end member 17 is a dispensing opening or vent hole which is preferably, although not necessarily, circular. A downwardly and outwardly projecting smoothly rounded flange or curl 25 is formed at and defines the opening (FIGS. 5, 6 and 7). The curl 25 formed about the periphery of the opening includes an upper segment 27 extending above the plane of the opening and a smoothly curved lower segment 29 which lies below the upper surface 18 of lid 17. The lower segment 29 of curl 25 curves downwardly below the plane of the opening and then turns upwardly and outwardly in a smooth curve until it merges, at the point of its maximum diameter 30, with the curl upper segment 27. Preferably, the curl is turned inwardly until the edge of the lid is in contact with the upper surface of the lid.

Seated in the dispensing opening is a plug closure 31 which comprises an inwardly convex bottom closure wall 33, upwardly extending side wall 37, a peripheral stop flange 41, and a ring pull 45 with a pair of projecting legs 47, 47' to assist in prying the plug from the opening (FIGS. 2 and 5). The edges of the metal forming the ring pull are preferably bent under as shown in FIGURES 3 and 4 to reinforce the ring pull and minimize any danger of injury on the sharp edges thereof. As shown in FIGURE 2, the legs 47, 47' of ring pull 45 project outwardly only a short distance, it being preferred that the fulcrum end of the legs lie on a line which passes somewhere near the center of the closure wall 33.

Formed in side wall 37 intermediate stop flange 41 and the closure wall 33 is a shallow groove or recess 38 which closely corresponds in contour to the curvature of the upper segment 27 of curl 25. Below the plane 30 of the opening in an unpressurized container, only a short segment of side wall 37 lies in sealing contact with the surface of the curl as shown in FIG. 6, the area of sealing contact below the plane of the opening being indicated by lines A—A. The curvature of shallow groove 38 is sufficient to form a hermetic seal with only a portion of the curl 25 and lock the closure wall 33 under the lower portion 29 of the curl. As pressure is developed in any manner from within the container, the lid 17 is bulged outwardly and convex closure wall 33 becomes flattened, thereby effecting peripheral enlargement thereof. As the outwardly expanding edges of bottom wall 33 force the side wall 37 outwardly, the radius of curvature of groove 38 decreases until side wall 37 moves into contact with and assumes the curvature of the bottom portion 29 of curl 25 (see FIG. 7). In this expanded form, side wall 37 is more securely locked under flange 25 and the area of sealing contact as, for example, between lines A—A below the plane of the opening is substantially increased to compensate for the increase in internal pressure.

Where such a container with a cold carbonated beverage therein is allowed to stand until the temperature thereof rises to ambient resulting in an increase in internal pressure, the bottom wall 33 of the plug flattens and the area of sealing contact between the plug and curl 25 below the surface of lid 17 increases from A—A, FIG. 6, to B—B, FIG. 7. At the same time, the sealing pressure between the plug and curl increases in proportion to the rise in internal pressure.

In a slightly modified embodiment of the invention, side wall 37 of the plug is resiliently deformed about the surface of the elongated curl 25'. Where it is desired to effect a relatively large increase in sealing area with an increase in pressure, a curl can be employed having a relatively large radius of curvature below the plane 30 of the opening. In this way, a small reduction in the radius of the curvature of groove 38 in wall 37 brings a relatively large area of that wall into contact with the surface of the curl which lies below the plane of the opening.

In another embodiment of the invention, one or more concentric beads or grooves can be formed in the inwardly convex closure wall 33 to facilitate the outward flexure thereof. These beads which can extend from either surface of closure wall 33 are preferably used in cases where the plug is fabricated from relatively inflexible sheet metal. Materials from which the plug can be satisfactorily fabricated include metals such as steel, aluminum and the alloys thereof, as well as those synthetic resins having the needed resiliency.

Referring now to FIGS. 9 and 10, the numeral 60 designates a blank stamped from sheet aluminum or the like stock which is relatively soft, tough and readily deformable, having a thickness of about 0.01 inch. The size of the blank in any particular case depends upon the size of the opening into which the closure plug is to be mounted. Where, as here shown in FIGS. 1–8, it is desired to form a dished-in plug closure 31 having a peripheral groove 38 which engages in sealing contact with curl 25, and an outwardly extending stop flange 42, the blank is stamped into the desired shape in a two-step operation. In the first step, blank 60 is held by pressure pads 70 against the flat surface 75 of cupping die 78 while downwardly moving punch 85 forces blank 60 into the die cavity 80 until the blank assumes the contour of the surface 83 of the die (FIGS. 9 and 10). The die cavity 80 which is formed with a circular shallow depression 84 concentric about its center produces a thickened center portion 61 in the resultant intermediate cupped blank 63 (FIG. 10), the side walls 62 of cupped blank 63 having an outside diameter corresponding to that of the opening in the container and a curved upper portion at 62' which corresponds closely in contour to the upper segment 27 of curl 25.

The edges of the resultant cupped blank 63 can then be turned under by conventional methods as shown in FIG. 3. The blank can then optionally be inserted into the opening in a container lid and the assembly placed into extrusion die 90 (FIG. 11). As punch 85 compresses cupped blank 63 while the stop flange 41 is held by pressure pads 70 against the upper surface 91 of die 90, the thickened center portion 61 of the blank is thinned and the metal extrudes radially outwardly, thereby increasing the diameter of resultant convex closure wall 33. At the same time, the radially outwardly expanding closure wall 33 forces side wall 37 around a portion of the lower segment 29 of curl 25 until stop wall 96 on die 90 is reached (FIG. 12). The lid can then be removed from the die cavity for attachment to a can body.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What I claim is:

1. A pressure compensating plug which can be removably mounted to close an opening in a wall of a container, the opening being defined by a flange extending from the container wall, said plug being constructed of a deformable resilient material and comprising: side walls with a peripheral recess therein shaped to receive the flange, and a closure wall formed integral with and extending from the innermost portion of said side wall, the closure wall which traverses the opening and has at least its peripheral edge spaced inwardly from the plane of the opening, said closure wall being peripherally expandable by application of pressure thereto from within the container, whereby to increase the sealing contact pressure and the area of sealing contact between the flange and the plug side wall.

2. The pressure compensating plug as defined by claim 1, wherein the peripheral recess in the side wall is smoothly rounded to receive a curled portion of the flange.

3. The pressure compensating plug as defined by claim 1, wherein the closure wall is inwardly convex and sufficiently resilient to flex outwardly upon application of pressure thereto from within the container.

4. The pressure compensating plug as defined by claim 1, wherein a peripheral stop flange projects outwardly from an upper section of the side wall, said stop flange being adapted to engage the outside of the container wall and limit inward movement of the plug.

5. A pressure compensating plug which can be removably mounted to close an opening in a wall of a can, the opening being defined by smoothly rounded annular curl a portion of which extends inwardly from the can wall, said plug being constructed of a deformable resilient material and comprising: a peripheral stop flange, a closure wall, and a side wall spaced therebetween, the stop flange projecting outwardly over the curl and being above the adjacent can wall when the plug is mounted in the opening, said side wall having a smoothly rounded peripheral groove therein shaped to receive and contact at least a portion of the annular curl, the closure wall which completely traverses the opening having at least its peripheral edges spaced inwardly from the plane of the opening, the closure wall being formed integral with and extending from the innermost portion of the side wall, said closure wall being inwardly convex to facilitate peripheral expansion upon application of pressure thereto from within the container, whereby to increase the sealing contact pressure and the area of sealing contact between the annular curl and the plug side wall.

6. The pressure compensating plug as defined by claim 5, wherein the peripheral groove is shaped to accommodate and contact a substantial portion of the curl when the mounted plug is subjected to pressure from within the can.

7. The pressure compensating plug as defined by claim 5, wherein at least one concentric groove is formed in the closure wall.

8. The pressure compensating plug as defined by claim 5, wherein a ring pull extends from and is formed integral with the stop flange, whereby to facilitate the removal of the plug from the opening.

9. The pressure compensating plug as defined by claim 5, wherein aluminum is the material from which the plug is constructed.

10. In combination, a metal container having an opening in its lid and a pressure compensating plug mounted in the opening, said opening being defined by a smoothly rounded annular curl a portion of which extends inwardly from the lid wall, said plug being constructed of aluminum and comprising: a peripheral stop flange, a closure wall, and a side wall spaced therebetween, the stop flange projecting outwardly over the curl and being above the adjacent can wall when the plug is mounted in the opening, said side wall having a smoothly rounded peripheral groove therein shaped to receive and contact at least a portion of the annular curl, the closure wall which completely traverses the opening having its peripheral edges spaced inwardly from the plane of the opening, the closure wall being formed integral with and extending from the innermost portion of the side wall, said closure wall being inwardly convex to facilitate outward flexure with attendant peripheral expansion upon application of pressure thereto from within the container, whereby to increase the sealing contact pressure and the area of sealing contact between the curl and the groove in the side wall.

References Cited

UNITED STATES PATENTS 3,133,666   5/1964   Henchert _____ 220—60

FOREIGN PATENTS 1,047,110   12/1958   Germany.

GEORGE T. HALL, Primary Examiner

U.S. Cl. X.R.

220—24

UNITED STATES PATENT OFFICE
CERTIFICATE OF CORRECTION

Patent No. 3,472,416                                      October 14, 1969

Ralph William Hilton

It is certified that error appears in the above identified patent and that said Letters Patent are hereby corrected as shown below:

Column 5, lines 16 to 18, cancel "formed integral with and extending from the innermost portion of said side wall, the closure wall" and insert the same after "wall" in line 20, same column 5.

Signed and sealed this 13th day of October 1970.

(SEAL)
Attest:

Edward M. Fletcher, Jr.                              WILLIAM E. SCHUYLER, JR.
Attesting Officer                                             Commissioner of Patents